(12) United States Patent
Ohba (10) Patent No.: US 11,118,934 B2
(45) Date of Patent: Sep. 14, 2021

(54) METHOD AND SYSTEM OF ROUTE GUIDANCE FOR A TOWING VEHICLE

(71) Applicant: Alpine Electronics, Inc., Tokyo (JP)

(72) Inventor: Tetsu Ohba, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1028 days.

(21) Appl. No.: 14/631,427

(22) Filed: Feb. 25, 2015

(65) Prior Publication Data

US 2016/0245659 A1 Aug. 25, 2016

(51) Int. Cl.
*G01C 21/36* (2006.01)
*B62D 13/06* (2006.01)
*G01C 21/34* (2006.01)

(52) U.S. Cl.
CPC ......... *G01C 21/3697* (2013.01); *B62D 13/06* (2013.01); *G01C 21/3461* (2013.01)

(58) Field of Classification Search
CPC ........ G01C 21/3697; G01C 21/3461; G01C 21/34; G01C 21/36; B62D 13/06; B60P 1/649
See application file for complete search history.

(56) References Cited

U.S. PATENT DOCUMENTS

| | | | | |
|---|---|---|---|---|
| 6,567,743 B1* | 5/2003 | Mueller | ............ | G01C 21/3446 701/467 |
| 7,761,227 B2* | 7/2010 | Kropp | ................ | G01C 21/3697 701/418 |
| 9,659,301 B1* | 5/2017 | Briggs | .................... | G06F 16/22 |
| 9,810,542 B2* | 11/2017 | Mays | ................. | G01C 21/3685 |
| 9,881,268 B1* | 1/2018 | Briggs | .................... | G06Q 40/08 |
| 10,324,463 B1* | 6/2019 | Konrardy | ........... | G01C 21/3407 |
| 10,453,011 B1* | 10/2019 | Briggs | ............... | G01C 21/3697 |
| 10,625,782 B2* | 4/2020 | Fukushima | ............ | B62D 13/06 |
| 2007/0225900 A1* | 9/2007 | Kropp | ................ | G01C 21/3697 701/418 |
| 2009/0309761 A1* | 12/2009 | Nagase | .............. | G01C 21/3617 340/932.2 |
| 2013/0107045 A1* | 5/2013 | Soderlind | ................. | B60R 1/04 348/148 |
| 2014/0303886 A1* | 10/2014 | Roemersperger | .. | G01C 21/3461 701/411 |
| 2015/0066349 A1* | 3/2015 | Chan | ..................... | G01C 21/26 701/400 |

(Continued)

FOREIGN PATENT DOCUMENTS

JP 2005-001548 1/2005

*Primary Examiner* — Luis A Martinez Borrero
(74) *Attorney, Agent, or Firm* — Muramatsu & Associates (57) ABSTRACT

A method and system of route guidance for a vehicle alerts traffic restriction considering its towing status. The vehicle's towing status may be obtained either by automatically detecting a towed vehicle or manually setting such status by a user. When it is determined that the vehicle is towing another vehicle, traffic restriction information such as a speed limit and a dimension limit associated with each link in a route is obtained by accessing to a map database including such traffic restriction information. Based on the traffic restriction information, it is possible to provide the best route with a more correctly estimated time of arrival, while avoiding links which have dimension limits not suitable for the towing vehicle.

20 Claims, 5 Drawing Sheets

(56) References Cited

U.S. PATENT DOCUMENTS

| | | | |
|---|---|---|---|
| 2015/0134162 A1* | 5/2015 | Yamazaki | B60W 10/26 701/22 |
| 2015/0298697 A1* | 10/2015 | Kelly | B60W 30/14 701/37 |
| 2016/0019497 A1* | 1/2016 | Carvajal | G06Q 10/08 701/519 |
| 2016/0076906 A1* | 3/2016 | Hinnegan | G01C 21/36 701/408 |
| 2017/0219361 A1* | 8/2017 | Mays | G01C 21/3685 |
| 2018/0080788 A1* | 3/2018 | Belvadi Shankaraiah | G01C 21/3484 |
| 2018/0313661 A1* | 11/2018 | Eyster | G01C 21/3617 |
| 2019/0100245 A1* | 4/2019 | Fukushima | B62D 15/0275 |
| 2019/0265063 A1* | 8/2019 | Shankaraiah | G01C 21/3484 |
| 2020/0164890 A1* | 5/2020 | Shin | B60K 6/48 |
| 2020/0191587 A1* | 6/2020 | Fuchs | G06Q 30/0283 |
| 2020/0378777 A1* | 12/2020 | Canella | G01C 21/3453 |
| 2021/0031797 A1* | 2/2021 | Hayashida | G01C 21/3461 |

* cited by examiner

METHOD AND SYSTEM OF ROUTE GUIDANCE FOR A TOWING VEHICLE

BACKGROUND

1. Field

The present disclosure relates to a method and apparatus of route guidance for a vehicle. More specifically, embodiments in the present disclosure relate to a method and apparatus of route guidance for a towing vehicle depending on whether the vehicle is towing, which may be addressed by a user or automatically detected by the towing vehicle.

2. Description of the Related Art

Whether it is a freeway, highway (toll road) or surface street, a speed limit is assigned to each road. Mostly, the speed limit is related to a maximum speed at which road vehicles may be legally permitted to travel. However, sometimes the speed limit may be related to a minimum speed at which the road vehicles may legally travel. When a navigation system computes a route for guidance, the route is calculated based on speed limits as well as traffic, some environmental restrictions, such as one-way, permission or restriction of u-turn, right turn etc. As a result of this computation, the navigation system provides an estimated time of arrival (ETA), warnings beyond a speed limit posted for a road that the vehicle is currently driving based on Global Positioning System (GPS), and other information to a driver. However, conventional navigation systems available on market are designed for standard-sized passenger vehicles which do not consider if the vehicle is towing another car. Once the vehicle starts towing another car, different speed limits, typically slower, are likely to be assigned, however it is difficult for the towing vehicle driver to avoid speed limit violation or other traffic violation if they rely on the conventional navigation systems which provide warnings based on standard vehicle information. In addition, it is almost impossible to obtain an accurate ETA for the towing vehicle if the drivers rely on the conventional navigation system.

Furthermore, there are some roads which have dimension restrictions for vehicles. This may simply be a narrow road which does not have capacity, or a road under a bridge which may have a height restriction, etc. Again, this type of information is not considered in the conventional navigation systems because they are designed for standard-sized passenger vehicles. Thus, a driver of the towing vehicle may be forced to ignore a route including such a road that the towing vehicle is unlikely to be able to pass, either manually neglecting the guidance or entering the system to avoid the partial route having the restriction which may not guarantee that the rest of the route can accommodate the towing vehicle.

Accordingly, there is a need to provide a method and apparatus of route guidance for a towing vehicle depending on whether the vehicle is towing, which may be addressed by a user or automatically detected by the towing vehicle that is able to consider the towing status of the vehicle, and thus may be more useful for the driver of the towing vehicle.

SUMMARY

In one aspect, a method of route guidance for a towing vehicle is provided. This method includes the steps of determining whether a current routing mode is a towing route mode, accessing a map database comprising restriction information regarding a towing route vehicle if it is determined that the current routing mode is the towing route mode, and providing route information including the restriction information regarding the towing vehicle if it is determined that the current routing mode is the towing route mode.

In another aspect, a system of route guidance for a towing vehicle is provided. This system of route guidance for the towing vehicle includes a processor, one or more sensors which sense vehicle related information and a memory having a map database. The processor switches a current routing mode to a towing route mode and accesses the map database in the memory which stores restriction information regarding the towing vehicle, and provides route information including the restriction information regarding the towing vehicle if the current routing mode is the towing route mode.

In one embodiment, the processor automatically determines whether a current routing mode is a towing route mode. For example, the processor may automatically determine whether the current routing mode is the towing route mode by recognition of a second vehicle based on signals from the one or more sensors. Alternatively, a vehicle interface may receive towing mode information from the towing vehicle, and the processor automatically determines that the current routing mode is the towing route mode if the vehicle interface receives a towing drive mode from the towing vehicle.

In another embodiment, the system of route guidance may further include a display controller directly or indirectly coupled to a screen which displays a towing route mode selection menu that allows a user to manually select a towing route mode. For example, the display controller may display the towing route mode selection menu on the screen when a route search function is activated.

In one embodiment, in the system of route guidance, the processor may further search a route to a destination considering that the current routing mode is the towing route mode, and guide the route to the destination in the towing route mode. For example, the processor may further apply speed limits of a towing vehicle for links in candidate routes, and estimate times of arrival for the candidate routes based on the applied speed limits. In another example, the processor may further apply dimension limits of the towing vehicle for links in candidate routes respectively, and excludes the route from the candidate routes when the dimension of a combination of the first vehicle and second vehicle exceeds a smallest dimension limit in the route In one embodiment, the processor in the system of route guidance for the towing vehicle may further read a speed limit and a dimension limit of next link if it is determined that the current routing mode is the towing route mode, and alerts a user if at least one of a current vehicle speed or the dimension of a combination of the first vehicle and second vehicle exceeds the limits of next link.

The above and other aspects, objects and advantages will be readily apparent from the following detailed discussion.

DETAILED DESCRIPTION OF THE PREFERRED EMBODIMENTS

Various embodiments for a method and apparatus of route guidance for a towing vehicle will be described hereinafter with reference to the accompanying drawings. Unless defined otherwise, all technical and scientific terms used herein have the same meaning as commonly understood to one of ordinary skill in the art to which present disclosure belongs. Although the description will be made mainly for the case where the method and apparatus of route guidance for the towing vehicle, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventor is not entitled to antedate such disclosure by virtue of prior publications.

In general, various embodiments of the present disclosure are related to a method of route guidance for a towing vehicle. Furthermore, the embodiments are related to an apparatus of route guidance for a towing vehicle. Thus, more useful traffic restriction information such as speed limit and road dimension limit for towing vehicle would be available for the driver of the towing vehicle in order to achieve safe driving.

Figure 1:
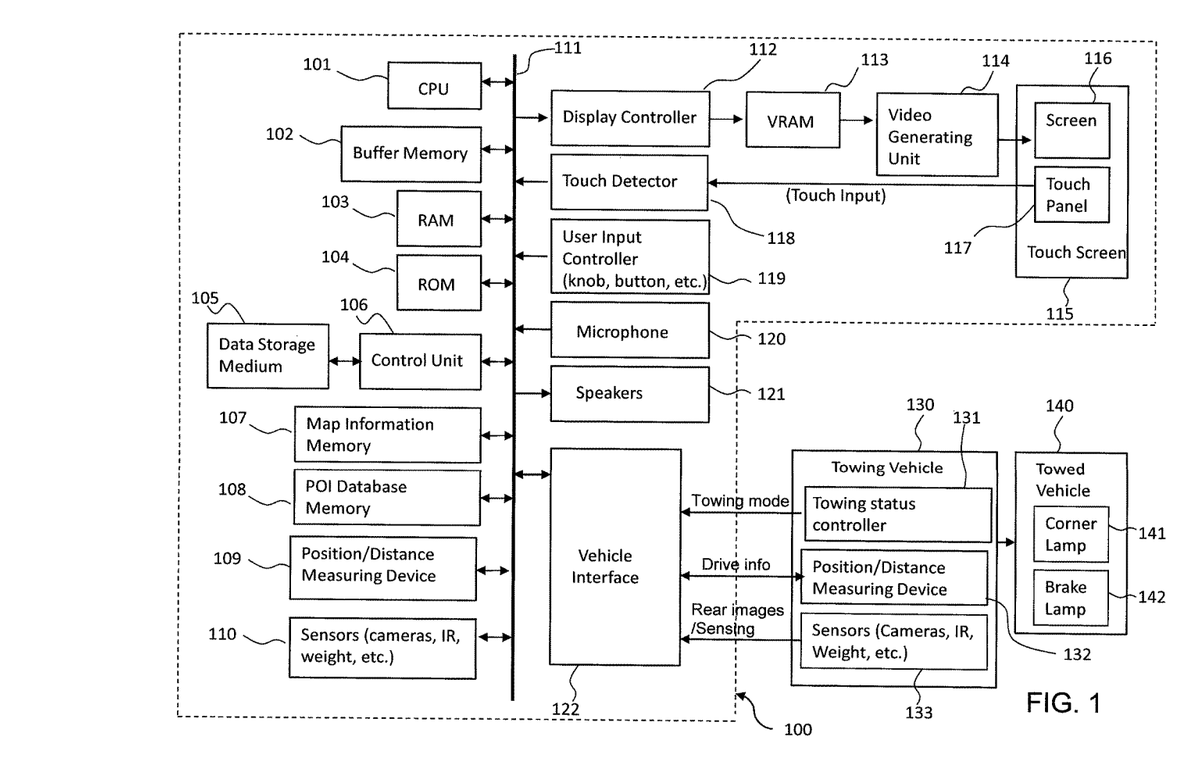
FIG. 1 is a block diagram including a navigation system providing route guidance for a towing vehicle, the towing vehicle and a towed vehicle according to one embodiment.

FIG. 1 is a block diagram of a route guidance system in a vehicle that executes a method of route guidance for a towing vehicle according to one embodiment. Note that the block diagram in FIG. 1 is merely an example according to one embodiment for an illustration purpose and not intended to represent any one particular architectural arrangement. The various embodiments can be applied to other types of route guidance system and implemented as long as the route guidance system can accommodate the method of route guidance for a towing vehicle. For example, the vehicle navigation system 100 includes a central processor unit (CPU) 101 for controlling an overall operation of the navigation system, a buffer memory 102 for temporally storing data such as an icon data table for efficiently displaying icons in accordance with this disclosure, a random access memory (RAM) 103 for storing a processing result such as a guide route, and a read only memory (ROM) 104 for storing various control programs, such as a route search program and a map matching program necessary for navigation control as well as a towing mode control program of this disclosure.

The vehicle navigation system 100 also includes a data storage medium 105 such as a hard disk in a hard disk drive (HDD), flash memory in a solid state drive (SSD) or USB key memory, a compact disc—read only memory (CD-ROM), a digital versatile disc (DVD) or other storage medium for storing the map data that includes various driving information for towing vehicles. The vehicle navigation system 100 also includes a control unit 106 for controlling an operation for reading the information from the data storage medium 105. The vehicle navigation system 100 further includes a map information memory 107 for storing a portion of the map data relevant to ongoing operations of the vehicle navigation system 100 which is read from the data storage medium 105, a point of interest (POI) database memory 108 for storing database information such as POI information which is read out from the data storage medium 105.

The vehicle navigation system 100 also includes a position/distance measuring device 109 for measuring a present vehicle position or user position. For example, the position measuring device 109 has a vehicle speed sensor for detecting a moving distance, a gyroscope for detecting a moving direction, a microprocessor for calculating a position, a global positioning system (GPS) for receiving and analyzing GPS signals, etc. Furthermore, the vehicle navigation system 100 may integrate or connect to sensors 110, such as cameras, infrared sensors, weight sensors, etc. The components mentioned above are connected via a bus system 111.

The vehicle navigation system 100 accommodates a plurality of means for receiving user inputs. For example, the navigation system 100 may include a touch detector 118 for detecting a touch or press input of a user on a touch panel 117 of a touch screen 115, which allows the user to enter intuitive look and feel input. Alternatively, as seen in a traditional vehicle entertainment system, any user input controller 119 such as knobs and buttons may be included in the navigation system 100. To accommodate hands-free input operation to avoid driver distraction, it may be appropriate to use voice commands as user inputs for the navigation system 100. To accommodate such voice commands, microphone 120 for receiving speech input may be included. Once a voice command is received at the microphone 120, the voice command is sent to a speech engine to be matched with any speech pattern associated with navigation related vocabulary in a speech database and the matched speech pattern is interpreted as a voice command input from the user. Although listed input means may be an example for selecting menus, executing selected functions etc., the navigation system may include various other input methods, to achieve the same and similar operations. The vehicle navigation system 100 may also include a plurality of means to output an interactive result of user input operations. For example, the navigation system 100 may include a display controller 112 for generating map images, such as map guide images, arrow guide images, icon images of POIs, possible alerts, as well as menu images related to the map information and the generated map image is stored in a video RAM (VRAM) 113. The map image stored in the VRAM 113 is sent to a video generating unit 114 where the map image is converted to an appropriate format to be displayed on a screen 116 of a touch screen 115. Upon the receipt of video data, the screen 116 displays the map. Alternatively, to keep eyes of a driving user on a road rather than prompting the driving user to look in to the screen, the interactive output may be presented to the driving user as audio feedback via one or more speakers 121.

Furthermore, the navigation system 100 may include a vehicle interface 122. Using the vehicle interface 122, the navigation system 100 may communicate with external devices inside a towing vehicle 130, external devices inside a towed vehicle 140, etc. For example, the vehicle interface 122 may be used for retrieving a vehicle's towing status from a towing status controller 131 in the towing vehicle, current driving information from one or more position/distance measuring devices 132 integrated to the towing vehicle, such as a vehicle speed sensor for detecting a moving distance, a gyroscope for detecting moving direction, a microprocessor for calculating a position, a global positioning system (GPS) for receiving and analyzing GPS signals, etc. Furthermore, using the vehicle interface 122, the navigation system 100 may communicate with sensors 133, such as cameras, infrared sensors, weight sensors, etc. which enables the navigation system to determine that the vehicle is towing by detecting the towed vehicle 140, by sensing an object behind the towing vehicle 130, either by image recognition, proximity sensing, weight sensing, etc., respectively, of a towed object.

The bus system 111 may include one or more busses connected to each other through various adapters, controllers, connectors, etc. and the devices and units mentioned the above are coupled to each other via the bus system.

The CPU 101 controls an overall operation of the navigation system including determining whether a current routing mode is a towing route mode, accessing a map database comprising restriction information regarding a towing vehicle if it is determined that the current routing mode is the towing route mode, and providing route information including the restriction information regarding a towing vehicle if it is determined that the current routing mode is the towing route mode. Please note that the towing route mode is one mode of the navigation system 100 which considers traffic restriction information regarding a towing vehicle. For example, the data storage medium 105 stores the map database in which the map data is configured in a layered structure where each layer stores the links, nodes and other information. Please note that this is merely an example, and it is possible to have the similar structured map database remotely and accessible via network. In such a layered structure, the higher layer represents only high class roads, for example, interstate highway, freeway, etc. with road links (road segments) of relatively large length and covers the wider area. In contrast, the lower layer represents low class roads, i.e., residential roads, etc. with many road links (road segments) of relatively short length, POI icons, building foot prints, etc., in addition to that represented by the higher layers. For each layer, traffic regulation information for towing vehicles, such as a speed limit and a dimension limit can be added for each link so that the navigation system is able to provide route guidance and alerts using the traffic regulation information for towing vehicles. As noted above, the navigation system 100 conducts the process of determining whether a current routing mode is a towing route mode.

Figure 2:
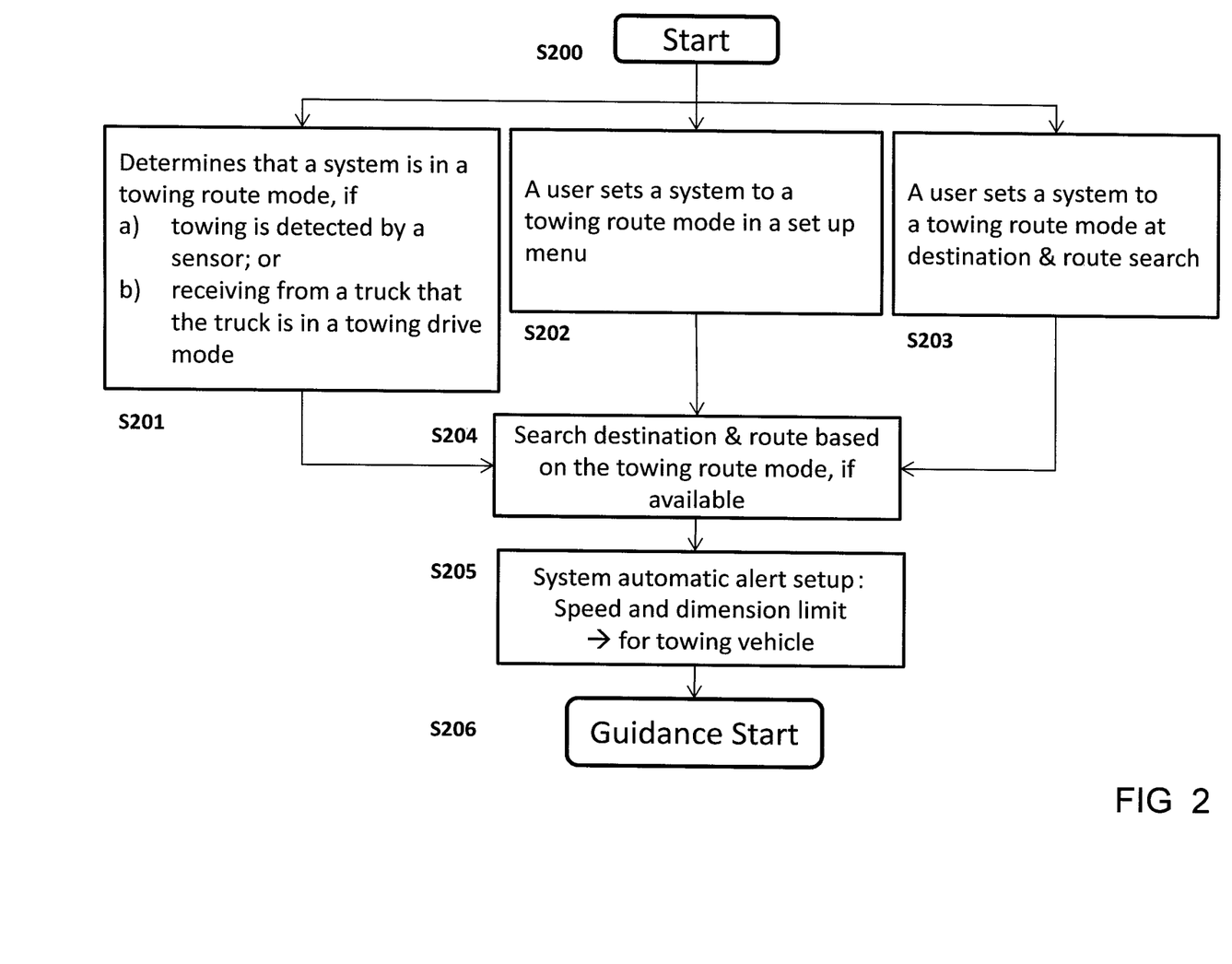
FIG. 2 is a flowchart of setting up for a towing route mode of a navigation system and providing route guidance according to one embodiment.

When a user enters a towing vehicle 130 and starts an engine which also activates the navigation system 100 (FIG. 2, S200), the navigation system tries to determine whether a current routing mode is a towing route mode. It is possible to determine that the current routing mode is the towing route mode in several ways (FIG. 2, S201). In one embodiment, the navigation system 100 is able to determine that the system 100 is in a towing route mode by automatic detection of a towed vehicle 140 using one or more sensors. For example, the automatic detection may be executed by recognizing the towed vehicle 140 in one or more images from one or more rearview cameras. Alternatively, one or more proximity sensors, such as ultrasonic sensors, electromagnetic sensors, radar based sensors, etc., may be located at a rear side of the towing vehicle 130 in order to detect the towed vehicle 140. In another way, sensing any tension or force due to weight at a towing device or coupling to the towed vehicle 140 at the towing device that is used for coupling the towing vehicle 130 and the towed vehicle 140 may result in effectively detecting the towed vehicle 140. These one or more sensors may be embedded sensors 133 in the towing vehicle 130 or aftermarket sensors 110 coupled to the navigation system 100. These sensing results are received via the vehicle interface 122 and processed at the CPU 101.

In another embodiment, it is possible to receive information on a towing drive mode of the towing vehicle 130 from a towing status controller 131 which manages whether the towing vehicle 130 is towing. Upon the receipt of the status indicative that the towing vehicle 130 is in a towing drive mode at the vehicle interface 122, it is possible to automatically determine that the navigation system 100 is in the towing route mode.

In another embodiment, it is possible for the navigation system 100 to allow a user to manually and explicitly select the towing route mode. For example, the navigation system 100 may have a set up menu where the user can turn on the towing route mode (FIG. 2, S202). Alternatively, the user may be able to set the system to the towing route mode when the user wishes to search a destination and a route to the destination, while operating a search function (FIG. 2, S203).

Once it is determined that the navigation system 100 is in a towing route mode, route information will be provided considering that the vehicle is towing. In one embodiment, for searching destination and calculating a route between the start point and the end point (FIG. 2, S204), the navigation system 100 checks various possible links starting from both the start point and the end point. When performing the route calculation, each link that is connected to the current expansion node is examined with respect to the cost of the link. The link cost is determined by taking such factors as a distance, a time length, a class of road, speed limits, traffic regulations, etc., into consideration. Here, the speed limits to be applied in the link cost are speed limits of a towing vehicle if it is determined that the navigation system 100 is in the towing route mode. To allow such functionality, as earlier mentioned, a map database, either locally located or externally located and communicable via network, etc., includes map data that is configured in a layered structure where each layer stores the links, nodes and other information traffic restriction data associated with each link, such as a speed limit and dimension limit for a towing vehicle, in addition to an ordinary vehicle. Based on the route calculation for the towing vehicle, an estimated time of arrival (ETA) is also obtained for the route which facilitates the towing vehicle considering the dimensions for the towing vehicle and using the speed limits of the towing vehicle. For example, a route with a link with a width limit which is shorter than a width of the towing vehicle may be excluded. If a parking lot of a destination does not have any capacity for a towing vehicle, the destination may be excluded from destination candidates. Thus, route guidance (FIG. 2, S206) including routing information further including restriction information such as speed limits, dimension limits, etc., will be provided while a current routing mode of the navigation system is the towing route mode.

Figure 3:
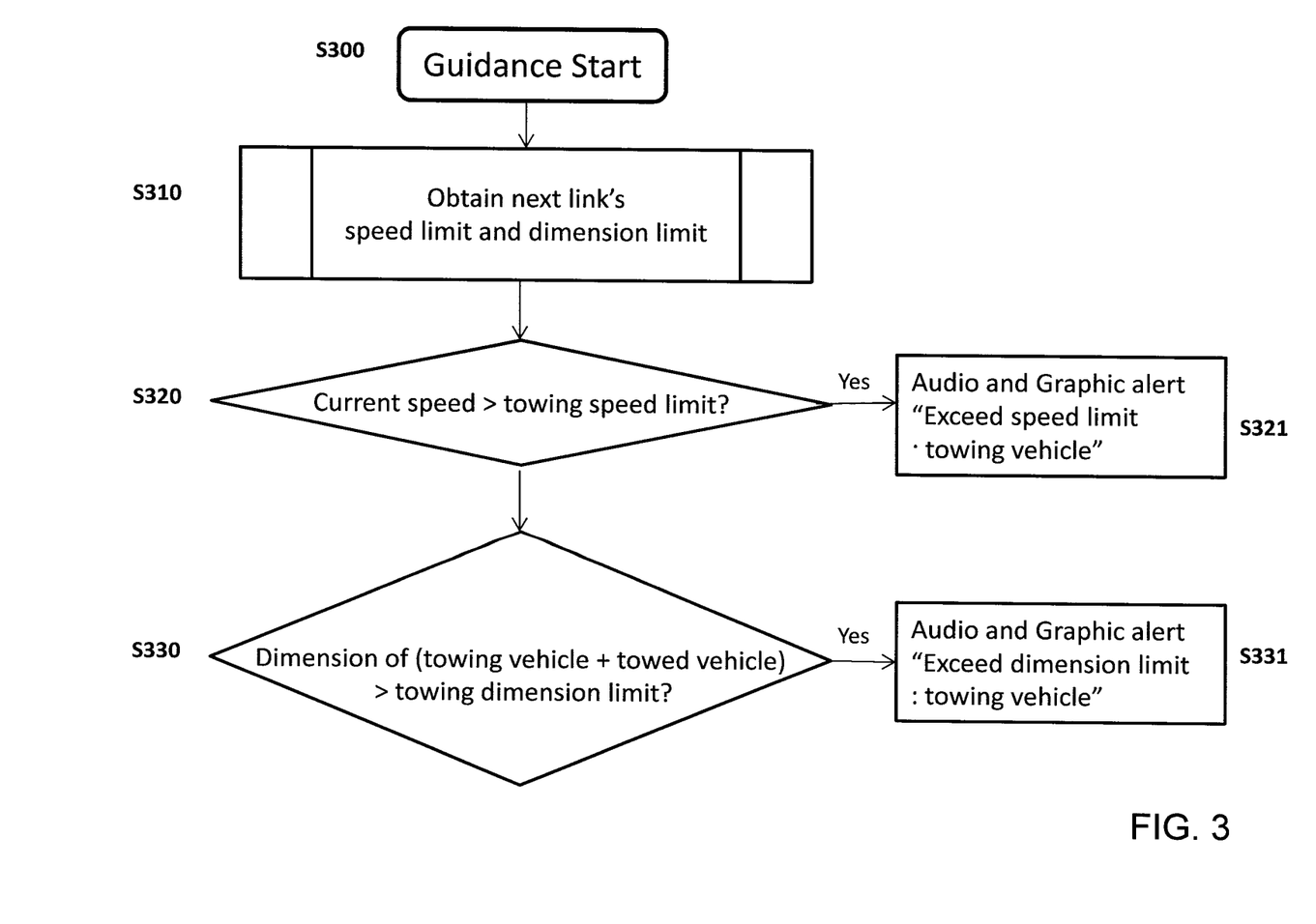
FIG. 3 is a flowchart of detecting restriction information for a towing vehicle and alerting a driver according to one embodiment.

In another embodiment, once it is determined that the navigation system 100 is in the towing route mode, the navigation system 100 automatically starts alerting the user to restriction information, such as a speed limit and a dimension limit, of a potential next link likely approaching by reading a speed limit and a dimension limit for a towing vehicle of the potential next link. This can be set up once the navigation system 100 determines that it is in the towing route mode (FIG. 2, S205). If the navigation system 100 is in the guidance, next potential link can be determined as a next link on the route. Once the guidance starts (FIG. 3, S300), for each next link, the speed limit and dimension limit is obtained (FIG. 3, S310). If the current speed is beyond the obtained speed limit for current and next link (FIG. 3, S320), there will be an alert indicating that the vehicle is exceeding a speed limit of the current and next link (FIG. 3, S321). If the total dimension of the towing vehicle and the towed vehicle is beyond the obtained dimension limit for next link (FIG. 3, S330), there will be an alert indicating that the combination of the towing and towed vehicles is exceeding the towing dimension limit for next link (FIG. 3, S331).

In another embodiment, if the navigation system 100 is not executing the guidance, the next link likely approaching may be determined based on a towing vehicle's speed, an angle of steering wheel, acceleration, deceleration, braking, gear information, etc.

Figure 4:
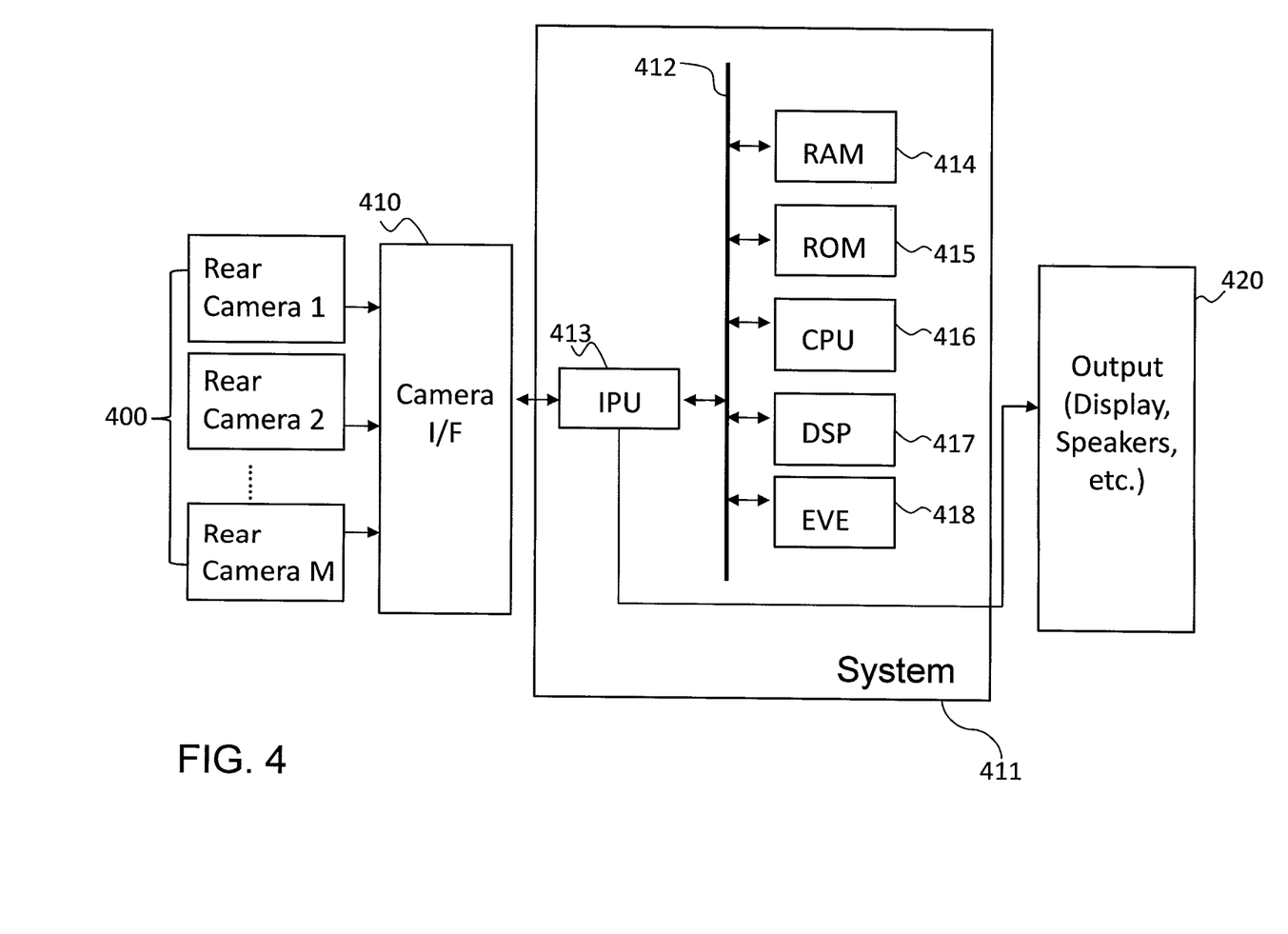
FIG. 4 is a close up block diagram of a plurality of rear cameras and a system block of a navigation system providing route guidance for a towing vehicle according to one embodiment.

In order to determine whether the current routing mode is the towing route mode, there are several ways as stated above in this description. In one embodiment, the automatic detection may be executed by recognizing the towed vehicle in one or more images from one or more rearview cameras which may be located at a rear side of the towing vehicle in order to detect the towed vehicle. As mentioned earlier, the rearview cameras may be embedded in the towing vehicle or aftermarket cameras coupled to the navigation system. A sample diagram of collecting images from a plurality of the rearview cameras is illustrated in FIG. 4. For example, the route guidance system of FIG. 4 may include a plurality of rearview cameras 400, including Rear Camera 1, Rear Camera 2 . . . and Rear Camera M where M is a natural number, each of which is able to record a series of images. A camera interface 410 receives the series of images as data streams from the plurality of cameras 400 and processes the series of images appropriate for stitching. For example, the processing may include receiving the series of images as data streams from the plurality of cameras 400 and converting serial data of data streams into parallel data for future processing. The converted parallel data from the plurality of cameras 400 is output from the camera interface 410 to a system 411 for creating a wide rear view. The system 411 includes several processing units within the system. An image processor unit (IPU) 413 which handles video input/output processing, a central processor unit (CPU) 416 for controlling high level operations of rear view creation process such as application control and decision making, one or more digital signal processors (DSP) 417 which handles intermediate level processing such as object identification, and one or more embedded vision engines (EVEs) 418 dedicated for computer vision which handles low level processing at pixel level from cameras. Random access memory (RAM) 414 may be at least one of external memory, or internal on-chip memory, including frame buffer memory for temporally storing data such as current video frame related data for efficient handling in accordance with this disclosure and storing a processing result. Read only memory (ROM) 415 is for storing various control programs, such as an object detection and identification control program and embedded software library, necessary for image processing at multiple levels of this disclosure. A system bus 412 connects various components described above in the system 411. Once the processing is completed by the system 411, the system 411 transmits the object detection and identification processing result from output of IPU 413 for a graphic or audio alert regarding route guidance and speed and dimension limits for the towing vehicle through a graphical and/or audio device 420, such as a display and/or speakers.

Figure 5:
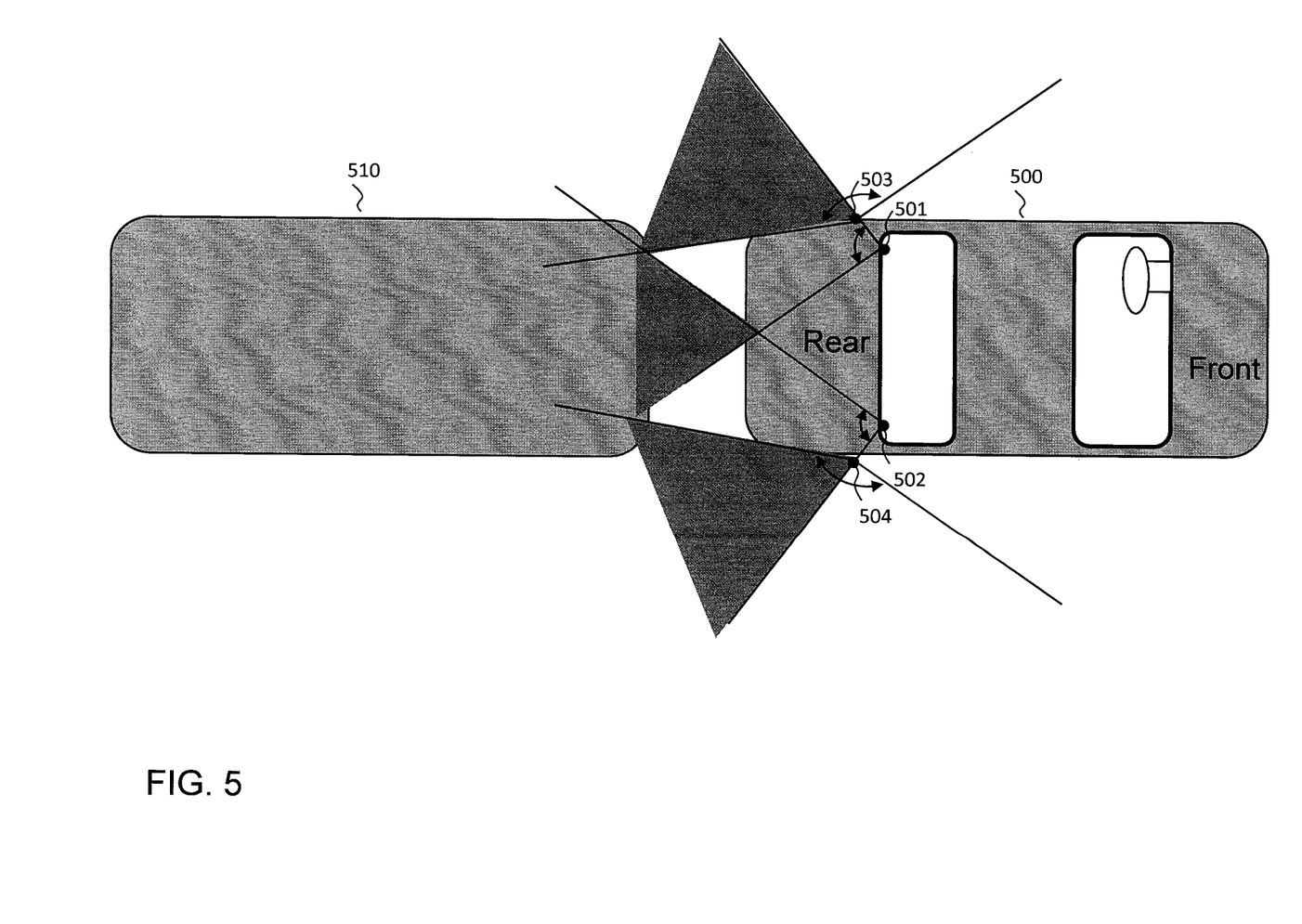
FIG. 5 is a schematic diagram of camera location arrangement of a towing vehicle in order to detect a towed vehicle according to one embodiment.

In one embodiment, a typical camera arrangement around the vehicle that employs omniview technology is illustrated in FIG. 5 where a plurality of cameras, 501, 502, 503 and 504 arranged at rear side of a towing vehicle 500 are used for synthesizing a surrounding rear view of the towing vehicle 500 in order to detect a towed vehicle 510. The omniview technology may use techniques such as distortion correction, and image fusion etc. for synthesizing images that can be utilized for object detection and identification of the towed vehicle 510. In the object detection process, Haar-like features or histogram of oriented gradients (HOG) features can be used as feature representation and object classification by training algorithms such as AdaBoost or support vector machine (SVM) can be performed. Using the results of object detection, a warning analysis module executed in a CPU 416 analyzes a distance to an object of interest which may be the towed vehicle 510. Based on the analysis, the warning analysis module determines whether the object of interest is the towed vehicle.

However, another sensor arrangement effective for detecting the towed vehicle may be used. For example, one or more ultrasonic sensors may be located at a rear bumper for detecting a towed vehicle. The one or more ultrasonic sensors emit high frequency sound wave signals towards objects around the sensors and receive and evaluate signals reflected back from the objects to evaluate the distance to the objects. If it is determined that the object is in a proximity and the reflected signal including several cues, such as noise that present under certain conditions, is indicative that the object is likely a towed vehicle, the object is detected as the towed vehicle. Alternatively, radar or sonar sensors can be used for the similar detection. Electromagnetic sensors may be also used and the electromagnetic sensors have advantages such as detecting objects around the bumper which rearview cameras and ultrasonic sensors may not be able to cover. Thus, if the towed vehicle with a small height is connected to the towing vehicle at a lower level, the electromagnetic sensors may work effectively for sensing the towed vehicle.

In another embodiment, a weight or tension sensor applied to towing equipment of the towing vehicle that measures force or tension by causing slight movement of the towing equipment, which makes it possible to obtain such force or tension indicative of a towed vehicle coupled to the towing equipment of the towing vehicle.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of route guidance for a first vehicle to reach one or more destinations, comprising:
    measuring, by a position measuring device which includes a GPS (Global Positioning System) receiver, a present vehicle position based on GPS signals so as to guide the first vehicle to the destination via a calculated route;
    sensing, by a sensor of the first vehicle, an object behind the first vehicle;
    determining whether a current routing mode is a towing route mode;
    accessing a map database comprising restriction information regarding a towing vehicle, which includes information regarding whether a parking lot of the destination has capacity for the towing vehicle, if it is determined that the current routing mode is the towing route mode; and
    providing route information on the calculated route including the restriction information regarding a towing vehicle, if it is determined that the current routing mode is the towing route mode, and
    wherein determining whether a current routing mode is a towing route mode is automatically executed by recognition of a second vehicle behind the first vehicle based on signals from the sensor of the first vehicle, and the sensor of the first vehicle includes an ultrasonic sensor that emits sound wave signals and receives signals reflected back from the object behind the first vehicle to determine that the second vehicle exists, and wherein if the parking lot of the destination does not have any capacity for the towing vehicle, the destination is excluded from destination candidates to establish another destination.

2. The method of route guidance of claim 1,
    wherein the sensor of the first vehicle is a rearview camera that captures images behind the first vehicle.

3. The method of route guidance of claim 1,
    wherein the sensor of the first vehicle is a weight sensor that senses force due to weight of the second vehicle.

4. The method of route guidance of claim 1,
    wherein determining whether a current routing mode is a towing route mode is automatically executed by receiving a towing drive mode of the first vehicle.

5. The method of route guidance of claim 1, further comprising:
    allowing a user to manually select a towing route mode.

6. The method of route guidance of claim 5,
    wherein allowing a user to manually select a towing route mode is executed when a route search function is activated.

7. The method of route guidance of claim 1,
    wherein accessing the map database comprising restriction information regarding a towing vehicle, if it is determined that the current routing mode is the towing route mode, comprises:
        searching a route to a destination considering that the current routing mode is the towing route mode; and
    wherein providing route information including the restriction information regarding a towing vehicle if it is determined that the current routing mode is the towing route mode comprises:
        guiding the route to the destination in the towing route mode.

8. The method of route guidance of claim 7,
    wherein searching the route to the destination considering that the current routing mode is the towing route mode comprises:
        applying speed limits of a towing vehicle for links in candidate routes; and
        estimating times of arrival for the candidate routes based on the applied speed limits.

9. The method of route guidance of claim 7,
    wherein searching the route to the destination considering that the current routing mode is the towing route mode comprises:
        applying dimension limits of a towing vehicle for links in candidate routes respectively; and
        excluding the route from the candidate routes when the dimension of a combination of the first vehicle and second vehicle exceeds a smallest dimension limit in the route.

10. The method of route guidance of claim 1,
    wherein providing route information considering that the current routing mode is the towing route mode further comprises:
        reading a speed limit and a dimension limit of next link if it is determined that the current routing mode is the towing route mode; and
        alerting a user if at least one of a current vehicle speed or the dimension of a combination of the first vehicle and second vehicle exceeds the limits of next link.

11. A system of route guidance for a first vehicle to reach one or more destinations, comprising:
    a position measuring device which includes a GPS (Global Positioning System) receiver that measures a present vehicle position based on GPS signals so as to guide the first vehicle to the destination via a calculated route;
    a sensor of the first vehicle configured to detect an object behind the first vehicle;
    a processor;
    one or more sensors configured to sense vehicle related information; and
    memory comprising map database;
    wherein the processor is configured to switch a current routing mode to a towing route mode, to access the map database comprising restriction information regarding a towing vehicle which includes information regarding whether a parking lot of the destination has capacity for the towing vehicle, and to provide route information on the calculated route including the restriction information regarding a towing vehicle if the current routing mode is the towing route mode, and
    wherein the processor is configured to automatically determine whether the current routing mode is the towing route mode by recognition of a second vehicle behind the first vehicle based on signals from the sensor of the first vehicle, and the sensor of the first vehicle includes an ultrasonic sensor that emits sound wave signals and receives signals reflected back from the object behind the first vehicle to determine that the second vehicle exists, and wherein if the Parking lot of the destination does not have any capacity for the towing vehicle, the destination is excluded from destination candidates to establish another destination.

12. The system of route guidance of claim 11,
    wherein the sensor of the first vehicle is a rearview camera that captures images behind the first vehicle.

13. The system of route guidance of claim 11, wherein the sensor of the first vehicle is a weight sensor that senses force due to weight of the second vehicle.

14. The system of route guidance of claim 11, further comprising:
a vehicle interface configured to receive towing mode information from the first vehicle,
wherein the processor is configured to automatically determine that the current routing mode is the towing route mode if the vehicle interface receives a towing drive mode of the first vehicle from the first vehicle.

15. The system of route guidance of claim 11, further comprising:
a display controller directly or indirectly coupled to a screen;
wherein the display controller is configured to display a towing route mode selection menu on the screen that allows a user to manually select a towing route mode.

16. The system of route guidance of claim 15, wherein the display controller is configured to display the towing route mode selection menu on the screen when a route search function is activated.

17. The system of route guidance of claim 11, wherein the processor is further configured to search a route to a destination considering that the current routing mode is the towing route mode, and to guide the route to the destination in the towing route mode.

18. The system of route guidance of claim 17, wherein the processor is further configured to apply speed limits of a towing vehicle for links in candidate routes, and to estimate times of arrival for the candidate routes based on the applied speed limits.

19. The system of route guidance of claim 17, wherein the processor is further configured to apply dimension limits of a towing vehicle for links in candidate routes respectively, and to exclude the route from the candidate routes when the dimension of a combination of the first vehicle and second vehicle exceeds a smallest dimension limit in the route.

20. The system of route guidance of claim 11, wherein the processor is further configured to read a speed limit and a dimension limit of next link if it is determined that the current routing mode is the towing route mode; and to alert a user if at least one of a current vehicle speed or the dimension of a combination of the first vehicle and second vehicle exceeds the limits of next link.

* * * * *